July 11, 1967 S. R. ETNYRE 3,330,443
CONTROL FOR MATERIAL DISTRIBUTING APPARATUS
Filed Aug. 12, 1965 2 Sheets-Sheet 1
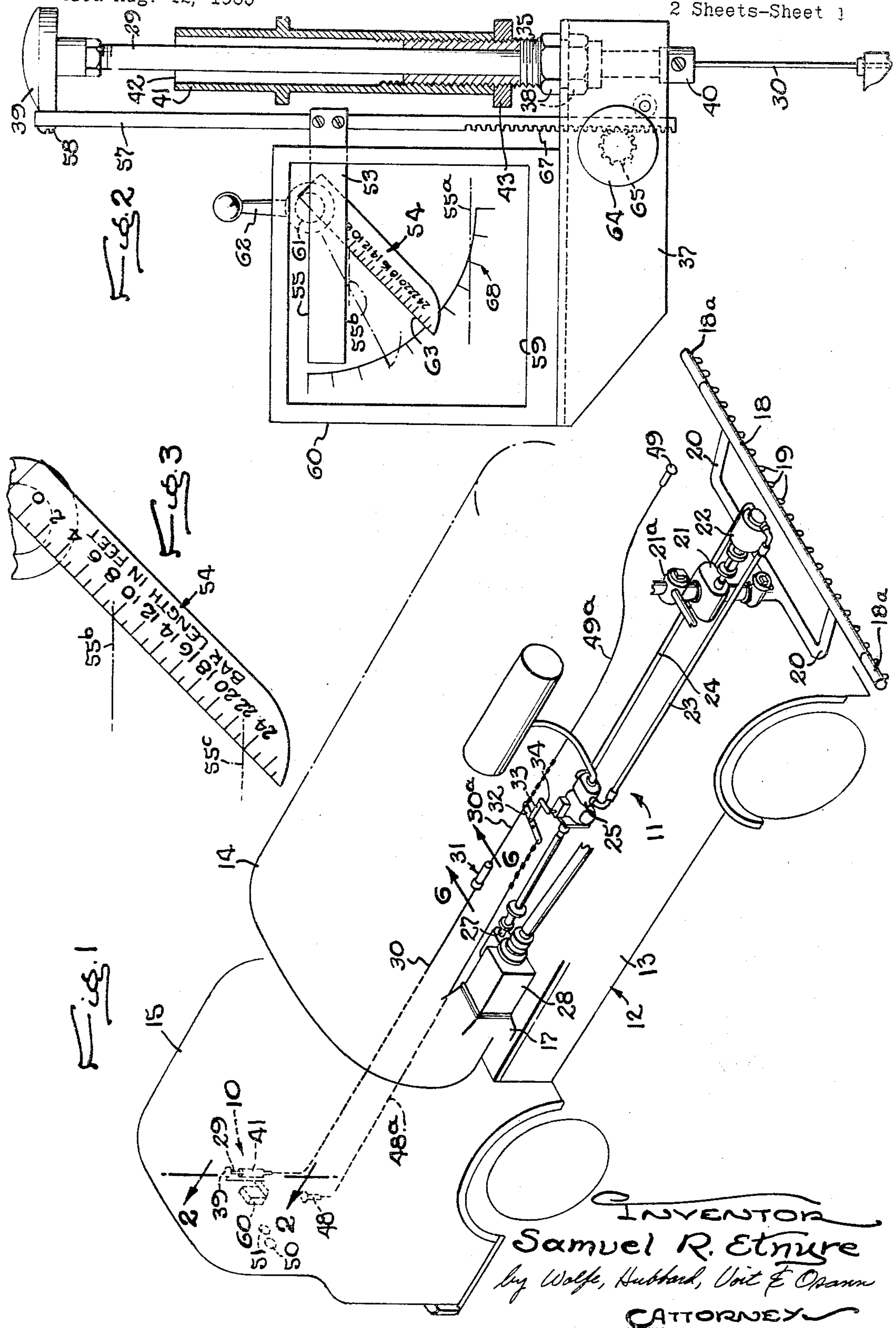

CONTROL FOR MATERIAL DISTRIBUTING APPARATUS
Filed Aug. 12, 1965
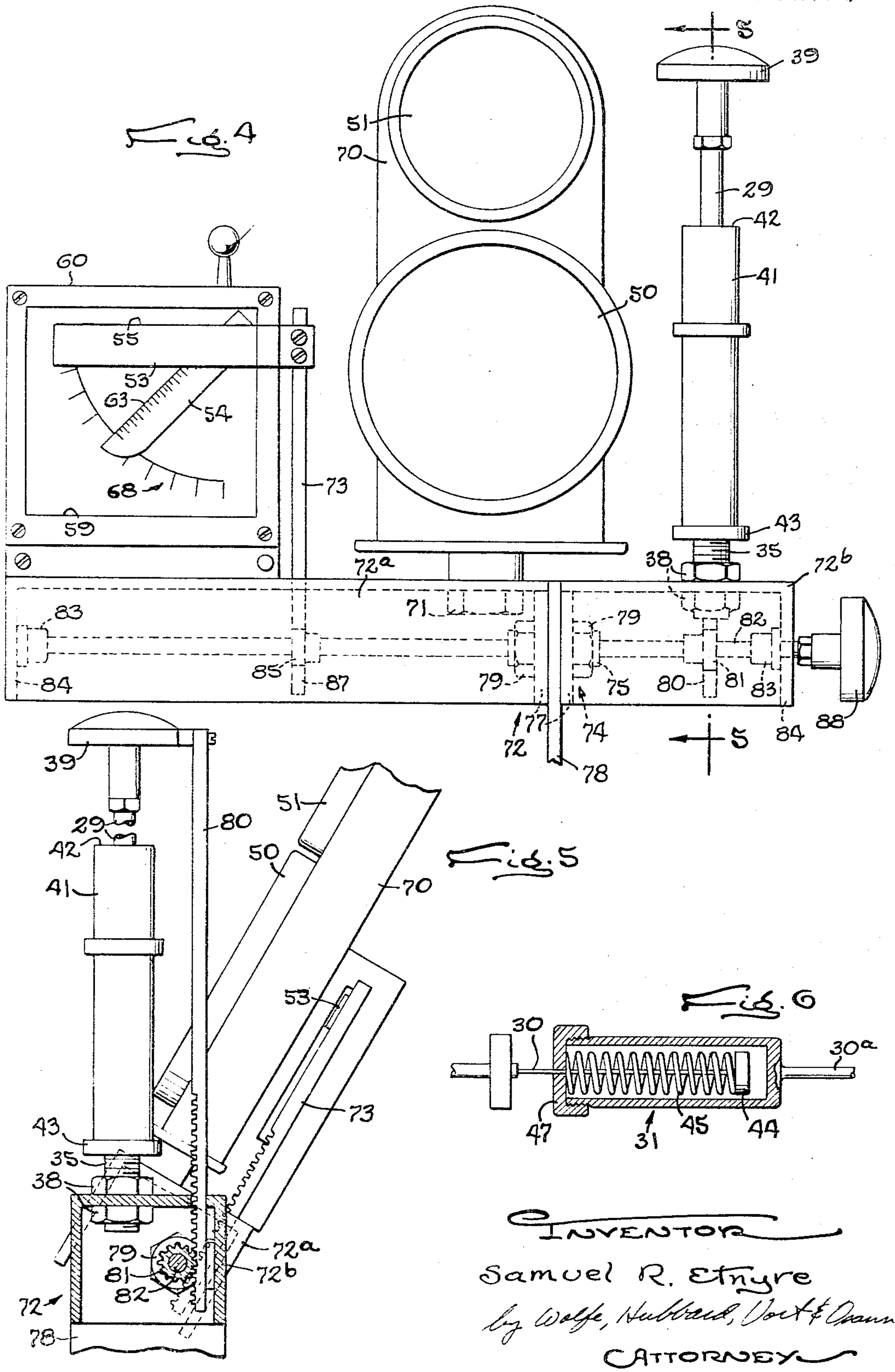

United States Patent Office 3,330,443

Patented July 11, 1967

3,330,443

CONTROL FOR MATERIAL DISTRIBUTING APPARATUS

Samuel R. Etnyre, Oregon, Ill., assignor to E. D. Etnyre & Co., Oregon, Ill., a corporation of Illinois Filed Aug. 12, 1965, Ser. No. 479,166
12 Claims. (Cl. 222—31)

This invention relates to a mobile material distributing apparatus, such as a truck for spreading fluent or liquid road surfacing material, having a pumping system including a variable output pump and a discharge element, typically an elongated spray bar, fed by the pump and operable to spread the material over a width of the road surface determined by the length of the spray bar used. More particularly, the invention is concerned with the control of the rate of application of the distributed material.

In known spreader units, the pump is driven by the vehicle engine through a selectively variable drive permitting the selection of a drive ratio which produces and maintains a uniform application rate through a given length of spray bar despite variations in the speed of travel of the vehicle. In practice, the proper drive ratio and discharge rate are determined by making a trial run and manually adjusting the ratio until the desired discharge rate at a given speed is obtained. Then, in operation, the pump discharge rate varies in accordance with the vehicle speed to maintain a uniform application rate. When the length of the spray bar is changed, however, it is necessary to adjust the drive ratio in order to maintain the prescribed application rate on a different width of road surface. In the past, the selection of the new drive ratio has been a time-consuming operation requiring either fairly complex computations or another trial run.

The general object of the present invention is to eliminate the need for time-consuming trial runs or complex computations and facilitate the quick and easy selection of a new drive ratio for the different length of spray bar.

Another object is to provide a novel pump control for increasing and decreasing the pump drive ratio in direct proportion to increases and decreases in the length of the spray bar by a simple manipulation and with no need for computation.

A more detailed object is to utilize an indicator arm positioned automatically as an incident to the selection of the proper drive ratio for a given application rate to position a divider which thereafter indicates the proper position of the operator for selecting each new drive ratio, regardless of the spray bar length to be used.

A further object is to provide such a control which is extremely simple in construction and operation.

Still another object is to provide such a control which, after a period of service use with a given vehicle, makes it possible to duplicate a previously used application rate without even an initial trial run, regardless of the spray bar length to be used.

Another object is to support the components of such a control in a novel manner for selective positioning relative to each other for the most convenient access by the operator of the truck.

Other objects and advantages of the invention will become apparent from the following detailed description taken in connection with the accompanying drawings, in which FIGURE 1 is a schematic perspective view of a vehicle equipped with a pumping system and a control embodying the novel features of the present invention.

FIG. 2 is an enlarged fragmentary view taken substantially along the line 2—2 of FIG. 1 and shown partly in cross-section and partly in elevation.

FIG. 3 is an enlarged fragmentary view similar to a portion of FIG. 2.

FIG. 4 is a view similar to FIG. 2 but showing an alternate form of the invention.

FIG. 5 is a fragmentary end view of the form shown in FIG. 4.

FIG. 6 is an enlarged fragmentary cross-sectional view taken along the line 6—6 of FIG. 1.

As shown in the drawings for purposes of illustration, the invention is embodied in a control 10 for the pumping system 11 of a bituminous material distributor truck 12 (FIG. 1) comprising a chassis 13 carrying a tank 14 on its rear portion and a cab 15 and an engine 17 on its forward portion. At the rear of the truck is a hollow spray bar 18 carrying a plurality of evenly spaced downwardly directed nozzles 19 to which surfacing material such as asphalt is pumped from the tank to be sprayed onto the road.

In operation, material carried in the tank 14 is fed to the spray bar 18 through two pipes 20 (FIG. 1) communicating with the discharge port of a pump 21 having an intake port adapted for connection to the tank through an intake valve 21[a]. The pump is driven by a hydraulic motor 22 operated by pressure fluid supplied through lines 23, 24 by a second pump 25 which, in turn, is driven by a power-take-off drive 27 on the truck transmission 28. The transmission, of course, is driven by the truck engine 17. Thus, the pump 25 provides pressure fluid to drive the motor 22 and the asphalt pump 21 at speeds proportionate to the speed of operation of the vehicle engine. The drive pump is a variable-displacement pump having a reaction plate (not shown) which is adjustable by the control 10 to vary the output rate for a given speed of the engine, and the asphalt pump is a positive displacement pump which discharges fluid at a rate proportionate to its speed of operation.

With this arrangement, the hydraulic motor 22 responds proportionately to variations in the speed of the vehicle power train to increase the flow of fluid to the spray bar 18 as the vehicle 12 accelerates and to reduce the flow as the vehicle speed is reduced, thereby assuring a uniform rate of material application to the road surface. Moreover, the rate can be adjusted by varying the drive ratio between the p.t.o. drive 27 and the motor 22 to raise or lower the speed of the asphalt pump relative to the speed of the vehicle. Thus, the drive pump and the motor constitute a hydrostatic transmission coupling the vehicle transmission 28 to the asphalt pump and adjustable to transmit a complete range of incremental speed ratios to the pump.

The control 10 includes a manually movable operator 29 in the form of a plunger connected by a flexible wire 30 and a lost-motion connection 31 (FIGS. 1 and 6) to one end of a control lever 32 connected by a link 33 to a pump control arm 34 which positions the reaction plate of the drive pump 25 and thus varies the drive ratio of the asphalt pump 21 to adjust its discharge rate for a given vehicle speed. Herein, the plunger is formed by an elongated rod slidably guided for back and forth endwise movement in an externally threaded tubular stud 35 extending through the upper side of a supporting bar 37 and held in place by lock nuts 38 tightened against opposite sides of the bar which forms a platform for the control. The platform bar preferably is of inverted U-shaped cross-section as shown in FIG. 5. On the upper end of the plunger rod is a knob 39 and on the lower end is a clamp 40 fastening the wire 30 to the rod. A spacer 41 is threaded on to the stud above the bar, with its upper end 42 forming an adjustable stop engageable with the knob to limit the downward motion of the plunger. When the knob is pushed down into contact with the spacer, the pump 25 is set to power the asphalt pump 21 at a selected drive ratio. The spacer normally is held in place by a knurled lock nut 43 abutting against the lower end of the spacer, but can be released for adjustment simply by turning the lock nut away from the spacer.

Once the spacer has been positioned, the pumping system may be turned off simply by pulling the plunger up to the "off" position in FIG. 2, and is turned back on by pushing the plunger down until the knob 39 abuts against the stop end 42. The lost-motion connection 31 is formed by a cylinder fastened at its right end in FIG. 6 to the right portion 30[a] of the connecting wire, and a disk 44 within the cylinder fastened to the left portion of the wire and urged to the right by a coiled compression spring 45 confined in the left portion of the cylinder. The wire projects loosely through the left end wall 47 of the cylinder. This arrangement permits overriding control of the pump 21 by auxiliary operators 48 and 49 arranged in convenient locations around the truck and connected to the control lever 32 by chains and wires 48[a], 49[a] to rotate the lever clockwise as viewed in FIG. 1 for momentary accelerated pump operation without disturbing the setting of the operator 29.

As indicated in FIG. 1, the control 10 preferably is placed in the truck cab 15 for convenient operation by the truck operator while he is driving the truck. The other instruments in the cab include a so-called bitumeter 50 which indicates the truck speed in feet per minutes, a pump tachometer 51 indicating the discharge rate of the asphalt pump in gallons per minute, and other controls (not shown) for the customary operating valves.

The application rate to be used for a particular project is prescribed by the written specifications for the project in gallons per square yard. The spray bar length depends upon the width of the road surface to be covered and is easily adjusted in a well known manner by adding or removing sections 18[a] of bar at one or both ends of the latter, usually in increments of one or two feet each. With a prescribed application rate and selected length of spray bar, reference material is used to provide the recommended speed to be used in feet per minute and the pump output in gallons per minute necessary at that speed to produce the required application rate. Then, with the asphalt pump discharge port connected through its control valves to a return line preferably incorporated in the intake valve 21[a], he makes a trial or "dry" run at the prescribed speed (with the pump discharge circulating back into the tank 14) while adjusting the plunger 29 and the drive pump displacement until the prescribed asphalt pump discharge rate is obtained, as indicated on the pump tachometer 51. Usually, the adjustment is made by holding the knob 39 against the spacer 41 and turning the latter in a direction to progressively increase the discharge to the desired rate.

Then the spacer is locked in the selected position with the nut 43 and the system is ready for operation. It will be seen that the initial setting of the drive ratio maintains a uniform rate of application, regardless if the variations in speed, as long as the bar length remains constant. When the truck reaches a wider or narrower stretch of road and the length is changed, however, it is necessary to adjust the pump output in order to maintain the prescribed application rate while covering the new surface area.

In accordance with the present invention, a novel indicating mechanism is incorporated in the control 10 with an indicator arm 53 positioned automatically in accordance with the drive ratio initially selected to obtain the prescribed rate wtih the initial bar length, and with a divider 54 positioned in accordance with the prescribed application rate to provide an immediate indication of the proper position of the arm 54 and the operator 29 to obtain the same rate with any other bar length. For this purpose, the indicator arm is supported for movement with the operator through a range of parallel positions each corresponding to a different setting of the operator and thus to a different drive ratio between the "off" position and the "full-on" position of the operator, and the divider is pivotally supported for swinging movement through a series of angularly spaced positions in which the divider defines inclined or diagonal lines of different slopes across the range of indicator positions.

The divider 54 is graduated longitudinally in equal increments corresponding to the increments of adjustment of the spray bar length. With this arrangement, when the proper increment of length on the divider is aligned with the indicating edge 55 of the arm 53, the divider assumes an angular position that corresponds to the desired application rate. When the indicating edge is moved into alinement with any selected increment of bar length on the divider, the asphalt pump discharge is adjusted automatically to deliver liquid to the spray bar 18 at the rate necessary to obtain the selected application rate through that length of spray bar.

In this instance, the indicator arm 53 is an elongated bar perpendicular to the plunger rod 29 and supported for movement with the latter on a second rod 57 fastened adjacent its upper end at 58 to the knob 39 and extending downwardly through the platform bar 37 parallel to the plunger rod. The indicator arm projects laterally from the plunger across a rectangular opening 59 defined by a shallow box-like frame 60 on the platform bar. The opening preferably is covered by a protective glass and is positioned to overlie the full range of motion of the indicating edge 57, from the "off" position shown in full in FIG. 2 to the "full-on" position shown at 55[a].

The divider 54 is a bar pivoted on the back of the frame 60 adjacent the upper right corner of the opening 59 on a pin 61 perpendicular to the plane of the indicator arm 53 and supporting the divider for swinging movement in a parallel plane immediately behind the indicator. A radial adjusting lever 62 fastened to the pivot pin projects upwardly above the top of the frame for easy adjustment of the angular position of the divider. Preferably, a friction drag is applied to the divider mechanism in any suitable manner to hold the divider releasably in each selected angular position.

It will be seen in FIGS. 2 and 3 that one edge 63 of the divider passes through the pivotal axis of the divider and is graduated in equal increments corresponding to one foot each, for example, from zero to twenty-eight feet. The zero mark lies on the pivotal axis and the twenty-eight foot mark is the free end of the graduated edge. Moreover, the axis is alined with the edge 55 of the indicator arm 53 when the latter is in the "off" position shown in FIG. 2.

In preparing for operation of the spreader unit at a prescribed application rate (for example, .5 gallon per square yard) with a length of spray bar 18 dictated by the width of the surface to be treated (for example, a bar ten feet long), the truck operator consults reference material to determine the suggested road speed and the pump discharge rate that should be used. With the assumed figures stated above, the suggested speed is 180 feet per minute and the rate is 100 gallons per minute. The operator then drives the truck at the suggested speed with the pump discharge directed back into the tank 14, and adjusts the plunger 29 progressively downwardly until discharge indicated by the pump tachometer 51 reaches 100 gallons per minute, thereby establishing the proper drive ratio to obtain the prescribed application rate with a spray bar ten feet long, regardless of the speed of the vehicle. Then the divider 54 is rotated into the position in which the ten foot mark on the edge 63 is alined with the indicating edge 55 as shown at 55[b] in FIG. 2, and is left in this position.

Since the angular position of the divider 54 corresponds to the selected application rate, all that is necessary to adjust the pump discharge for a different bar length is adjustment of the plunger 29 to bring the indicator arm 53 to the new position indicated by the graduations on the divider. For example, when the truck reaches an area where it is desirable to increase the length to 24 feet, extensions are added to the bar to bring it up to the new length and the plunger is adjusted downwardly to move the arm to the position shown at 55$^c$ in FIG. 3.

To make this adjustment, the spacer 41 is shifted downwardly away from the knob 39 and the plunger 29 is pushed down to its new position, either by pushing on the knob or by turning an adjusting knob 64 journaled on the platform bar 37 beneath the frame 60 and carrying a pinion 65 meshing with a rack 67 formed on the lower end portion of the rod 57 to shift the plunger endwise in response to turning of the knob 64. It will be seen that temporary increases in the spray bar length and pump drive ratio require downward adjustment of the spacer, while decreases in the pump drive ratio can be effected without moving the spacer.

An additional feature of the control 10 is the ease of duplicating a previously used application rate at a later date. Because the angle of the divider 54 corresponds to the rate, all that is necessary is the recording of the rate and the divider angle as indicated by an arcuate scale 68 on the back of the frame. When the operator wishes to return to a previously used application rate, he simply consults his records for the proper divider angle, sets the divider at that angle, and alines the indicating edge 55 with the increment of bar length to be used. With this arrangement, the need for trial runs is substantially eliminated after sufficient experience with the control. The scale 68 can be graduated by the manufacturer in application rates for the particular vehicle if the expenditure of the time necessary to do so is considered worthwhile. In view of the many different gear ratios of the different makes of vehicles used, however, it has been felt that such graduation is better left to the operators of the units.

Shown in FIGS. 4 and 5 is an alternate arrangement of the components of the control which facilitates the use of the control by the truck operator while he is driving the truck. In this instance, the bitumeter 50 and the pump tachometer 51 are housed in a case 70 bolted at 71 to one end portion 72$^a$ of the platform 72 beside the frame 60 for the divider 54 and the indicator arm 53, and the operator plunger 29 is mounted on the opposite end portion 72$^b$ of the platform. The indicator arm is supported on a rod 73 disposed alongside the frame and guided for up and down endwise motion on the platform. The two end portions of the platform, however, are formed by separate bars joined together by a pivot joint 74 formed by a tubular stud 75 extending through side-by-side flanges 77 depending from the adjacent ends of the bars 72$^a$, 72$^b$ on opposite sides of a support plate 8. Nuts 79 threaded onto the projecting ends of the stud hold the flanges movably against the support plate.

Offset from and paralleling the plunger rod 29 is a rack 80 which is fastened at its upper end to the knob 39 and meshes adjacent its lower end with a pinion 81 fast on a perpendicular shaft 82 extending through the stud 75 along the axis of the pivot joint 74. As shown in FIG. 4, the shaft is journaled at its ends in bearings 83 supported on flanges 84 at the ends of the platform bars. Thus, the rack-and-pinion connection between the plunger 29 and the shaft 82 turns the latter back and forth in response to back and forth endwise motion of the plunger. A second pinion 85 on the shaft meshes with a rack 87 formed by the lower end portion of the rod 73 to convert the rotary motion of the shaft into endwise motion of the rod thereby positioning the indicator arm 53 in accordance with the position of the plunger 29, the pinions 81 and 85 being the same size and on the same side of the shaft to produce identical motions of the rod and the plunger. It should be understood that other well known types of drive connections can be used between the shaft and the two rods without departing from the invention. A knob 88 is mounted on the right end of the shaft for direct manual turning of the shaft.

With this arrangement, the control operates in the same manner as the control in FIG. 2. In addition, however, it is possible to adjust the angular position of the plunger 29 relative to the indicator arm 53 and gauges to bring the plunger into the most convenient position for access by the operator and to position the gauges at the angle that provides the best observation by the operator.

From the foregoing, it will be seen that the novel control eliminates the need for either computation or trial runs when the spray bar length is changed after a proper drive ratio has been established between the power source and the asphalt pump 21. With the proper position of the adjusting plunger 29 for the new drive ratio clearly indicated by the divider 54 and the indicator arm 53, the adjustment is made quickly and easily without danger of error. Moreover, the divider position may be recorded for further reference when it is necessary to duplicate the application rate, and the novel mounting of the control shown in FIGS. 4 and 5 enables the operator to position both the gauges and the plunger in the most convenient positions for operation of the control.

I claim as my invention:

1. In a vehicle with a power source for spreading liquid material on a road surface, the combination of, a tank on said vehicle for carrying the material, a spray bar of selectively variable length on said vehicle, a positive displacement pump for pumping the material to said spray bar, a hydrostatic transmission adustable to transmit a complete range of incremental speed ratios from zero to full drive coupling the power source to said pump to deliver material to said spray bar at selected rates proportionate to the speed of said power source, an operator connected to said transmission and movable back and forth through a range of positions adjusting said transmission through said range of ratios, an elongated indicator connected to and movable with said operator through a range of parallel positions corresponding to the positions of said operator, and an elongated divider pivotally supported at one end for swinging through a plurality of angularly spaced positions across the range of indicator motion, said divider being graduated longitudinally in increments corresponding to increments of said bar length for positioning said indicator and said operator and changing said speed ratio to maintain a preselected rate of distribution after changes in said bar length.

2. The combination defined in claim 1 in which said operator includes a plunger movable endwise back and forth, and said indicator arm is perpendicular to said plunger and projects laterally therefrom.

3. The combination defined in claim 2 further including a frame defining an opening across which said indicator arm projects, said divider being pivoted on said frame for back and forth swinging in a plane parallel to said indicator arm.

4. The combination defined in claim 3 in which said divider is pivoted to swing about an axis alined with one extreme position of said indicator and is graduated in increments from said axis toward its opposite end.

5. In a control for a material distributing apparatus having a discharge element adjustable for paths of different widths and a pumping system feeding said element and having a selectively variable discharge rate, the combination of, a platform, a plunger mounted on said platform for back and forth endwise motion through a range of positions between an "off" position and a "full-on" position to vary said discharge rate selectively from zero to maximum discharge, an elongated indicator arm mounted on and perpendicular to said plunger for movement therewith through a range of parallel positions corresponding to the range of positions of the plunger, a divider pivotally supported on said platform for swinging in a plane parallel to and adjacent said arm through a series of angularly spaced positions extending diagonally across said range of indicator motion, said divider being graduated longitudinally in increments corresponding to increments of path width for positioning of said arm and said plunger to vary said discharge rate in proportion to changes in said path width.

6. In a control for a material distributing apparatus having a discharge element adjustable for paths of different widths and a pumping system feeding said element and having a selectively variable discharge rate, the combination of, an elongated platform, a plunger mounted on one end portion of said platform for back and forth endwise motion in a first plane through a range of positions between an "off" position and a "full-on" position to vary said discharge rate selectively from zero to maximum discharge, an elongated indicator arm supported on the other end portion of said platform for movement in a second plane through a range of parallel positions corresponding to the range of positions of said plunger, an elongated divider pivotally supported on said other end portion for swinging in a third plane parallel to and adjacent said second plane through a series of angularly spaced positions extending diagonally across the range of indicator motion, said divider being graduated longitudinally in increments corresponding to increments of path width for positioning of said arm and said plunger to vary said discharge rate in proportion to changes in said path width, a pivot joint connecting said end portions for relative turning motion relative to each other, and means connecting said arm to said plunger for motion in unison therewith.

7. A control as defined in claim 6 in which said connecting means comprise a shaft extending through said pivot joint along the axis thereof, a first drive connection between said plunger and said shaft for converting back and forth motion of the plunger into back and forth turning of the shaft, and a second drive connection for converting said turning into back and forth motion of said indicator arm.

8. A control as defined in claim 7 in which said drive connections are rack-and-pinion connections.

9. A control for a material distributing apparatus having a spray bar of selectively variable length, a tank for holding a quantity of material to be distributed, a pump for feeding material from said tank to said bar, and a transmission driving said pump with a selectively variable speed ratio, said control comprising a control plunger movable endwise back and forth through a range of positions between an "off" position and a "full-on" position to vary said speed ratio in accordance with the position of said plunger, an elongated indicator arm projecting laterally from and supported for movement with said plunger through a range of parallel positions corresponding to the range of positions of said plunger, and an elongated divider pivotally supported for swinging in a plane parallel to said indicator arm through a series of angularly spaced positions extending across the range of indicator motion, said divider being graduated longitudinally in correspondence to increments of said bar length for the positioning of said plunger and said indicator arm and changing of said speed ratio after changes in said bar length.

10. A control for a material distributing apparatus having a spray bar of selectively variable length, a tank for holding a quantity of fluent material to be distributed, and a pump having a selectively variable discharge rate for pumping material from said tank to said bar, said control comprising a plunger movable endwise back and forth through a range of positions between an "off" position and a "full-on" position to vary the discharge rate of said pump selectively from zero to maximum discharge, an elongated indicator arm projecting laterally from and supported for movement with said plunger through a range of parallel positions in a common plane corresponding to the range of positions of said plunger, and an elongated divider pivotally supported at one end for swinging in a plane parallel to the plane of said plunger about an axis alined with said "off" position and through a plurality of angularly spaced positions extending diagonally across said range of indicator motion, said divider being graduated longitudinally in increments equal to increments of said bar length for positioning said plunger and said indicator arm and changing said discharge rate to maintain a selected distribution rate after changes in said bar length.

11. A control for a material distributing apparatus having a spray bar of selectively variable length, a tank for holding a quantity of fluent material to be distributed, and a pump having a selectively variable discharge rate for pumping material from said tank to said bar, said control comprising an operator movable back and forth through a range of positions between an "off" position and a "full-on" position to vary the discharge rate of said pump selectively from zero to maximum discharge, an indicator supported on said control for movement with said operator through a range of parallel positions corresponding to the range of positions of said operator, and a divider supported for swinging through a series of angularly spaced positions extending across said range of indicator motion, said divider being graduated in increments corresponding to increments of said bar length for the positioning of said operator and said indicator and changing said discharge rate to maintain a selected distribution rate after changes in said bar length.

12. A control for a material distributing apparatus having a discharge element adjustable for paths of different widths and a pump feeding said element and having a selectively variable discharge rate, said control comprising an operator movable back and forth through a range of positions between an "off" position and a "full-on" position to vary the discharge rate of said pump selectively from zero to maximum discharge, an elongated indicator arm connected to and movable with said operator through a range of parallel positions corresponding to the range of positions of said operator, and a divider supported for swinging in a plane parallel to said operator through a series of angularly spaced positions extending across said range of indicator motion, said divider being graduated longitudinally in increments corresponding to increments of path width for positioning said operator and said indicator arm to vary said discharge rate in proportion to changes in said path width.

References Cited

UNITED STATES PATENTS

| | | | |
|---|---|---|---|
| 1,186,965 | 6/1916 | Baker | 222—31 |
| 1,433,713 | 10/1922 | Fricker | 222—178 X |
| 2,031,262 | 2/1936 | Hill | 222—178 X |
| 2,504,580 | 4/1950 | Pierson. | |
| 2,765,196 | 10/1956 | Munderich | 239—155 X |
| 3,233,832 | 2/1966 | Hallberg | 239—155 |

ROBERT B. REEVES, *Primary Examiner.*

N. L. STACK, *Assistant Examiner.*